June 5, 1956  L. W. BEDKER  2,748,633
THREAD ROLLING ATTACHMENT
Filed Nov. 27, 1950  5 Sheets-Sheet 1

INVENTOR.
LEO W. BEDKER
BY
ATTORNEYS

June 5, 1956  L. W. BEDKER  2,748,633
THREAD ROLLING ATTACHMENT
Filed Nov. 27, 1950  5 Sheets-Sheet 2
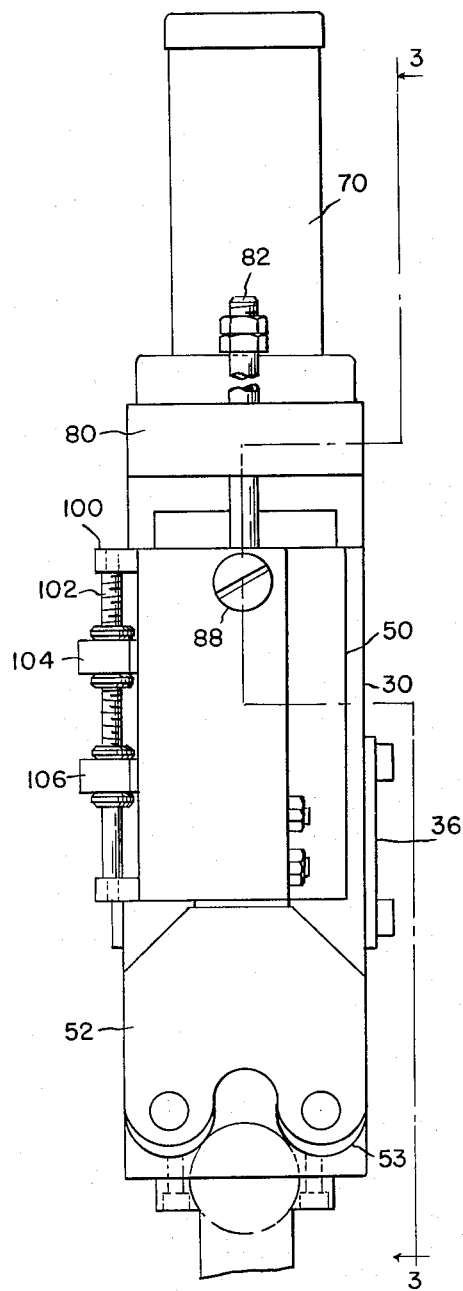
FIG.2.
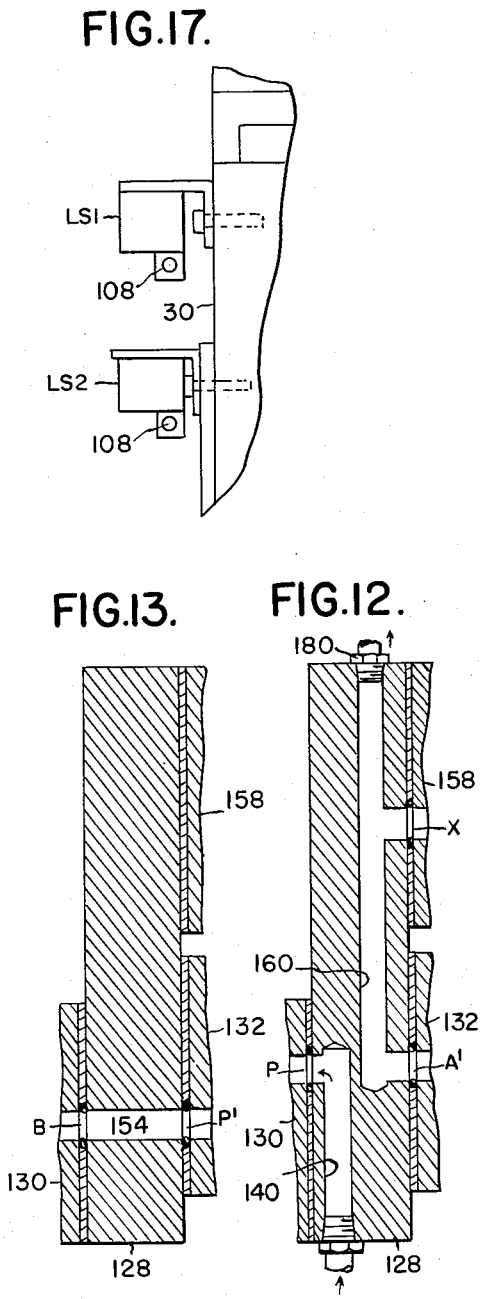
FIG.17.
FIG.13.  FIG.12.
INVENTOR.
LEO W. BEDKER
BY
Hulbert & Belknap
ATTORNEYS June 5, 1956 L. W. BEDKER 2,748,633
THREAD ROLLING ATTACHMENT
Filed Nov. 27, 1950 5 Sheets-Sheet 3

INVENTOR.
LEO W. BEDKER
BY
ATTORNEYS

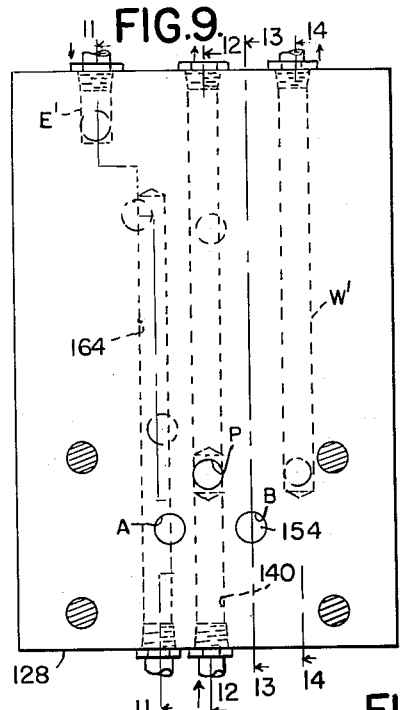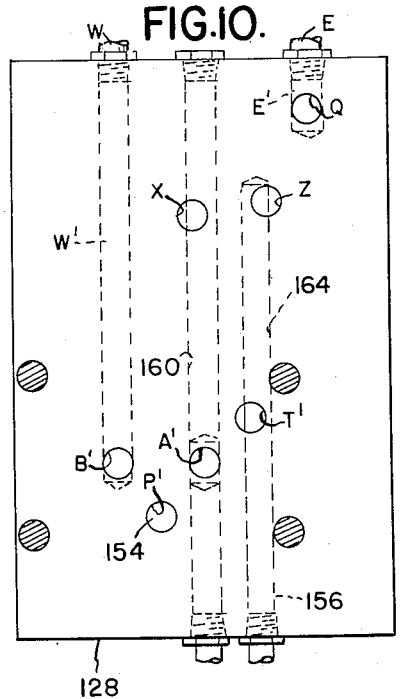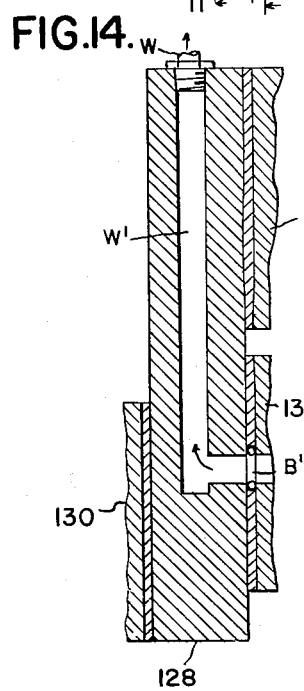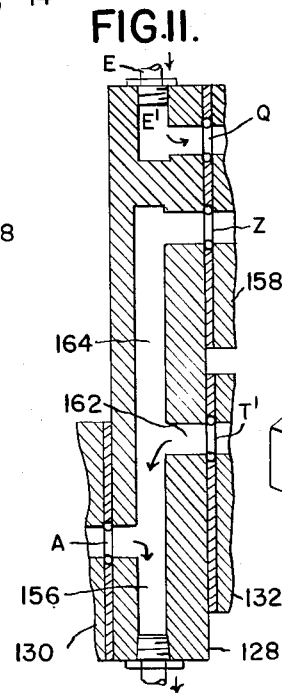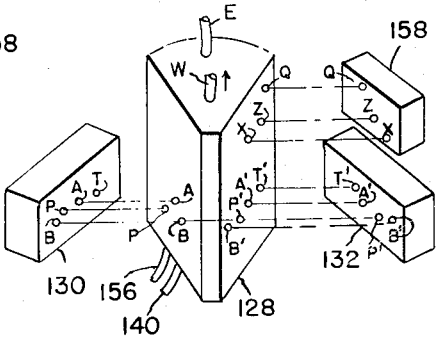

June 5, 1956 L. W. BEDKER 2,748,633
THREAD ROLLING ATTACHMENT
Filed Nov. 27, 1950 5 Sheets-Sheet 5

INVENTOR.
LEO W. BEDKER
BY
ATTORNEYS

United States Patent Office 2,748,633
Patented June 5, 1956

2,748,633

THREAD ROLLING ATTACHMENT

Leo W. Bedker, East Detroit, Mich., assignor of one-half to Emma G. Bedker, East Detroit, Mich.

Application November 27, 1950, Serial No. 197,735

1 Claim. (Cl. 80—6)

The present invention relates to an hydraulic unit and more particularly to an attachment for machine tools of the type having a rotary work support thereon.

In accordance with the present invention an attachment is provided which may be mounted on a conventional machine tool such for example as a turret lathe, so as to convert the lathe into an efficient thread rolling machine. For this purpose the work piece on which the threads are to be rolled is carried by the usual work support of the turret lathe. The hydraulic attachment is composed of two parts, one of which carries the thread rolling fixture and includes a hydraulic cylinder for effecting proper motion of the thread rolling fixture. This construction is mounted on an appropriate part of the machine tool and in the case of the turret lathe may conveniently be mounted directly on the turret.

The equipment includes a separate assembly comprising a motor, pump, and valves, this equipment being connected to the structure mounted on the machine tool by an electric control cable and a pair of conduits for conducting hydraulic fluid.

Automatic controls are provided effective to cause a back and forth reciprocation of the thread rolling fixture between predetermined limits and to bring the thread rolling fixture to rest in idle position upon completion of a cycle.

With the foregoing general description in mind it is an object of the present invention to provide hydraulic equipment capable of converting any machine tool having a rotary work support thereon into a machine for rolling threads.

It is a further object of the present invention to provide hydraulic equipment to actuate a thread rolling fixture between predetermined limits at predetermined rates of advance.

It is a further object of the present invention to provide novel structure for mounting a thread rolling fixture on a machine tool.

It is a further object of the present invention to provide a novel construction of hydraulic control valves for controlling the flow of fluid to a cylinder for actuating a thread rolling fixture.

Other objects and features of the invention will become apparent as the description proceeds, especially when taken in conjunction with the accompanying drawings, wherein:

Figure 2 is an enlarged fragmentary front elevational view of the mechanism for supporting and effecting movement of the thread rolling fixture.

Figure 4 is a section on the line 4—4, Figure 3.

Figure 5 is a section on the line 5—5, Figure 3.

Figure 6 is a section on the line 6—6, Figure 3.

Figure 8 is an exploded diagrammatic view illustrating the association between a pair of control valves, a metering valve, and a mounting plate therefor.

Figure 9 is a side elevational view of the fluid control plate illustrated in Figure 8.

Figure 10 is a side elevational view of the other side of the fluid control plate illustrated in Figure 8.

Figure 11 is a section on the line 11—11, Figure 9.

Figure 12 is a section on the line 12—12, Figure 9.

Figure 13 is a section on the line 13—13, Figure 9.

Figure 14 is a section on the line 14—14, Figure 9.

Figure 17 is a fragmentary enlarged elevation showing the mounting of the limit switches on the frame.

Figure 1:
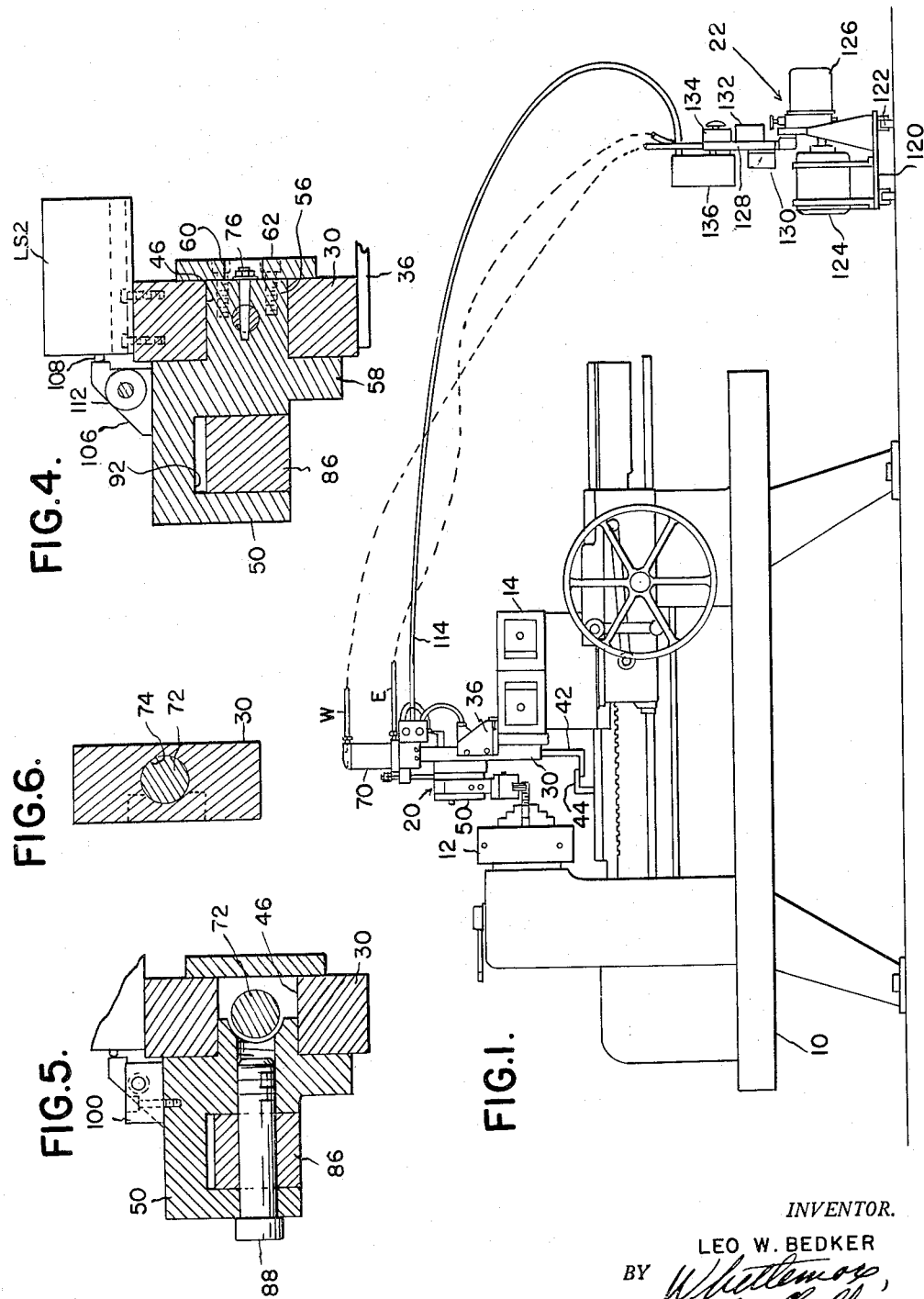
Figure 1 is a side elevation of a machine tool to which the hydraulic thread rolling conversion unit has been attached.

Referring now to the drawings, in Figure 1 there is illustrated at 10 a standard machine tool which in the present instance is a turret lathe. This machine carries a work driving head 12. Suitable means for rotating the head are incorporated in the machine. A turret is indicated at 14 and means are provided for advancing the turret toward and away from the work head.

In order to convert the turret lathe illustrated in the figure into mechanism for rolling threads, thread roll supporting and actuating mechanism indicated generally at 20 is mounted on the turret 14 of the lathe. Separate means, indicated generally at 22, comprising a source of hydraulic fluid under pressure and suitable controls therefor are connected to the mechanism 20.

Figure 3:
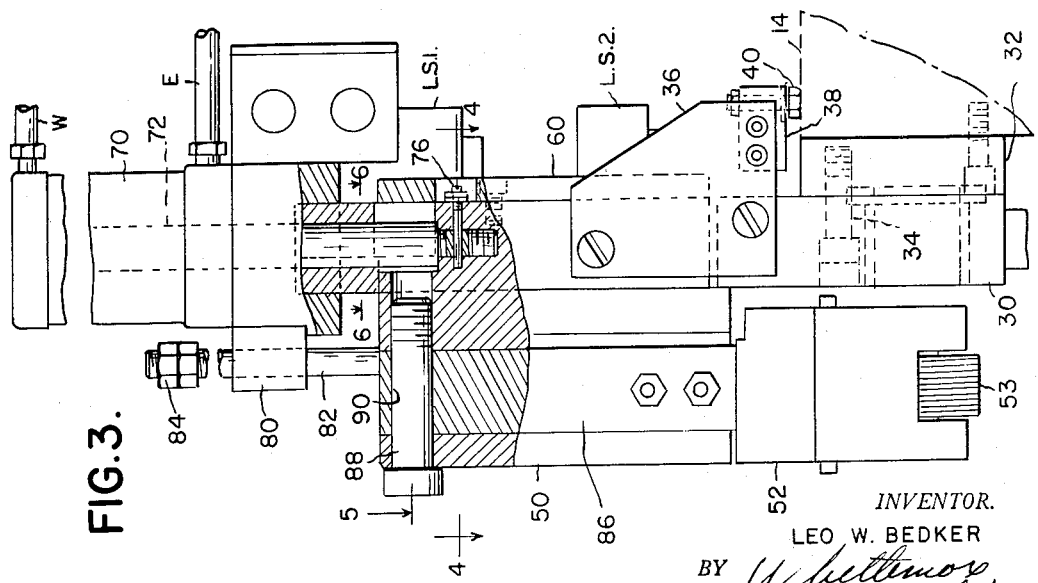
Figure 3 is a side elevational view of the mechanism shown in Figure 2, with parts in section as indicated by the section line 3—3, Figure 2.

Reference will first be made to the thread roll supporting and actuating mechanism 20. As best illustrated in Figures 1 through 8, this mechanism comprises a main supporting body 30 which is bolted or otherwise secured to the turret 14. In the present instance a separate mounting plate 32 is illustrated in Figure 3 as bolted independently to the turret 14 and the main supporting body 30 is then bolted to the mounting plate as indicated at 34. In order to improve the rigidity of the mounting for the thread rolling fixture the body 30 is provided with a pair of brackets 36 which extend rearwardly from the body and overlie the turret. Intermediate the brackets 36 is a transverse bar 38 which carries an abutment screw 40 adapted to engage the upper surface of the turret 14. Preferably the rigidity of the mounting of the body 30 is further improved in the particular device illustrated by a depending hook 42, best seen in Figure 1, which cooperates with a second hook 44 carried by the bed of the machine.

The main supporting body 30 is provided with a vertical slot 46 which constitutes guide ways for a slide 50 which in turn carries the thread rolling fixture indicated generally at 52. The thread rolling fixture will not be described in detail but in general it comprises a pair of opposed thread rolls 53 preferably mounted for rotation but interconnected by gearing so that as the thread rolls are moved tangentially over a rotating work piece, threads are rolled therein.

The slide 50, as best illustrated in Figure 4, includes a rearwardly extending rib 56 which extends into the vertical guide slot 46 of the support body 30 and is guidingly received therein. The slide 50 includes a laterally extending flange 58 which is guidingly engaged with the front surface of the main supporting body 30. The slide is retained in position in the slot 46 by a plate 60 bolted or otherwise secured to the rib 56 as indicated at 62.

A hydraulic cylinder indicated generally at 70, is mounted on the top of the main supporting body 30 and includes a piston (not shown) and a piston rod 72, the lower end of which passes through a cylindrical opening 74 provided in the upper portion of the main supporting body 30 in line with the slot 46, as best indicated in Figures 5 and 6. The piston rod 72 extends through the opening 74 into the slot 46, at which point it is connected to the upper end of the rib 56 of the slide 50. For this purpose the lower end of the piston rod 72 is threaded, as best seen in Figure 3, and is received within a correspondingly threaded opening provided in the upper end of the rib 56. A lock pin indicated generally at 76, extends through a transverse opening in the rib 56 and into an opening provided in the lower threaded portion of the piston rod.

At the upper end of the main supporting body 30 there is provided a laterally extending abutment 80 having a vertical hole therethrough through which extends a pin 82 extending upwardly from the top of the slide 50. Above the abutment 80 the pin 82 is threaded and carries abutment nuts 84. The purpose of the abutment and abutment nuts is to mechanically limit the downward movement of the slide 50 when hydraulic fluid is supplied to the cylinder 70. This is important since the thread rolling operation requires that the thread rolls be advanced to a definitely predetermined position over the work piece and further advance would mar the threads on the work piece.

The thread rolling fixture 52 includes a reduced shank 86 by means of which it is secured to the slide 50. For this purpose a mounting bolt 88 is provided passing through an opening 90 provided in the upper end of the shank 86 and through aligned openings adjacent the upper end of the slide 50, all as best illustrated in Figures 3 and 5. The thread rolling fixture 52 is required to have a certain amount of lateral movement so that it may accommodate itself to the work piece and for this purpose the slide 50 is shaped to provide a pocket 92 (Fig. 4) affording clearance so that the fixture 52 may rock slightly about the axis of the bolt 88.

Figure 7:
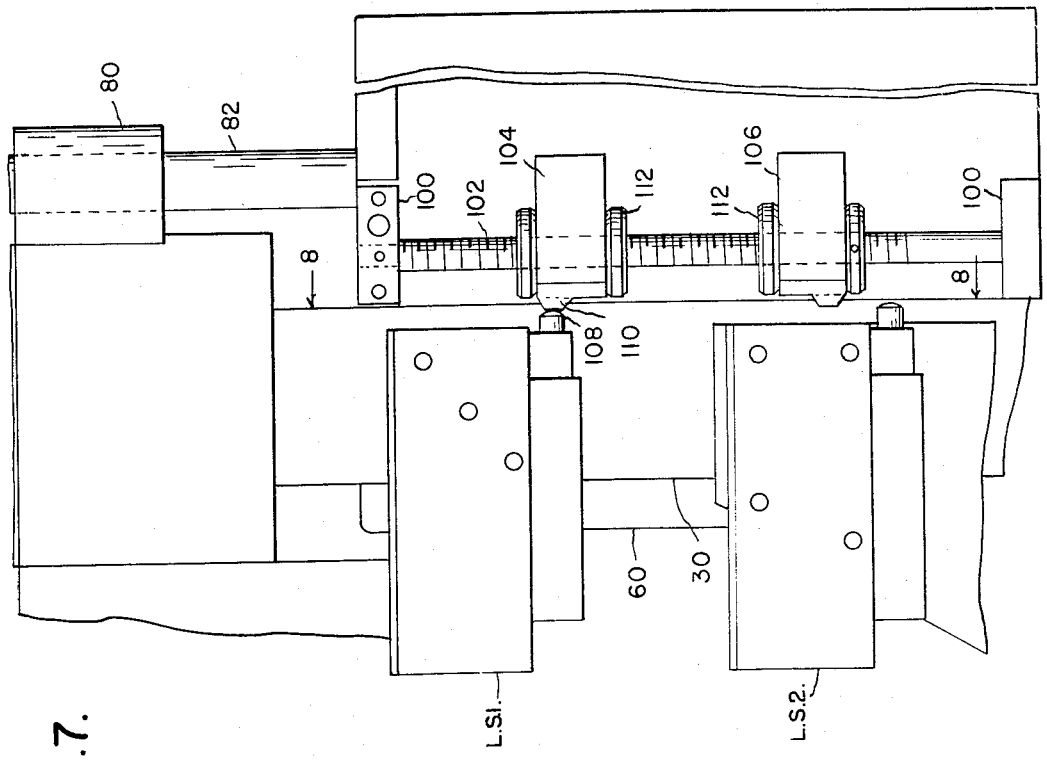
Figure 7 is an enlarged fragmentary side elevational view of the mechanism illustrated in Figure 2 as seen from the left in Figure 2.

In order to control reciprocation of the slide 50 a top limit switch LS1 and a bottom limit switch LS2 are mounted on the main supporting body 30, as best illustrated in Figures 3 and 7. The slide 50 is provided with a pair of laterally extending ears 100 between which extend a threaded rod 102, and on the rod 102 are provided a pair of adjustable switch actuators 104 and 106. Each of the limit switches LS1 and LS2 has a moveable member 108 adapted to be operated by a cam 110 (Fig. 7) on the corresponding actuators 104 and 106. Actuators 104 and 106, as best seen in Figure 4, have flat surfaces slidable against the adjacent surface of the slide 50 and each are provided with adjusting nuts 112 threaded on the rod 102. By means of loosening one of the nuts 112 and tightening the other, the actuators 104 and 106 may be very accurately adjusted to operate the limit switches LS1 and LS2 at predetermined points in the cycle of operation of the machine.

Referring now more specifically to Figure 1 and Figures 8 through 14, the hydraulic and electrical controls and actuating means for the attachment will be described. As best seen in Figure 1, a first fluid conduit W is connected to the top of the cylinder 70 and an exhaust conduit E is connected to the bottom of the cylinder. Electrical controls leading from the limit switches LS1 and LS2 to the pump and valve control assembly are indicated at 114. The control assembly comprises generally a base 120 illustrated as mounted on rollers 122 and carrying an electric motor 124 directly connected to a hydraulic pump 126. The connections between the pump and the hydraulic system include a fluid control plate 128 to which a pair of four-way valves 130 and 132 are secured.

In addition to the valves the plate 128 carries a metering valve 134 and an electrical control panel 136.

Figure 15:
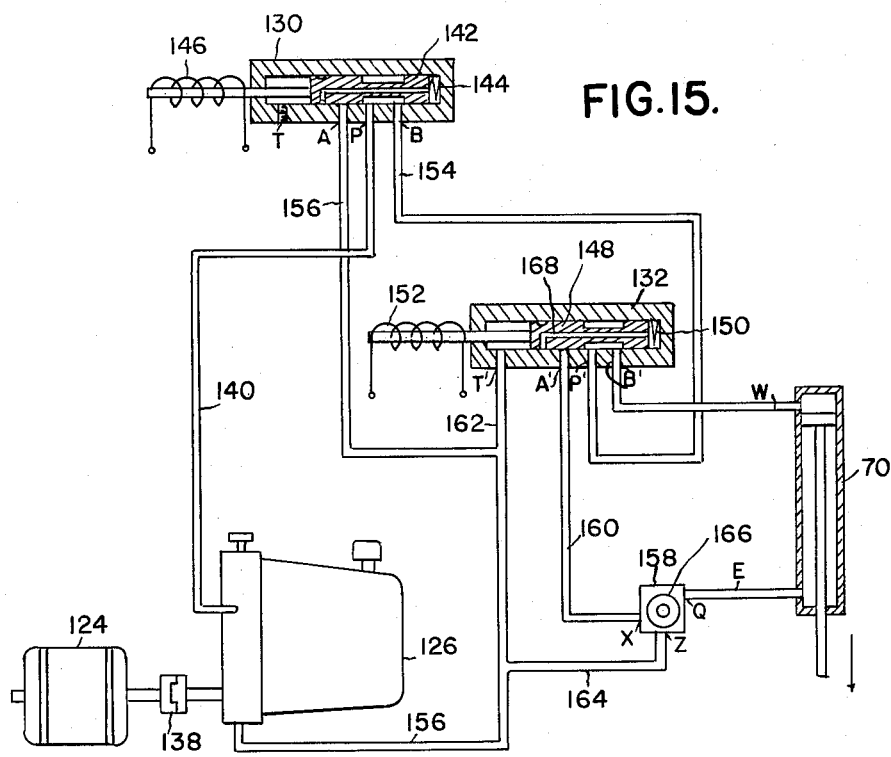
Figure 15 is a simplified flow diagram illustrating the manner in which the hydraulic control elements are interconnected.
Figure 16:
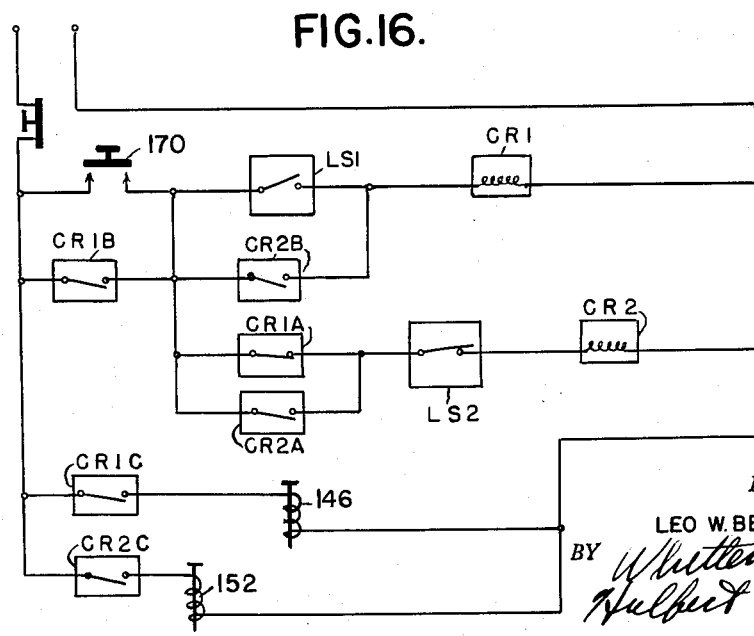
Figure 16 is a simplified wiring diagram illustrating the manner in which the electrical controls are interconnected.

Before referring to the detailed construction of the fluid control plate, reference is made to Figures 15 and 16 which are hydraulic and electrical diagrams respectively. Referring first to Figure 15 the electric motor 124 is illustrated as connected through a coupling 138 to the pump 126. The four-way valve 130 is connected to the outlet side of the pump through a pressure line 140. The valve 130 includes an inlet port P and outlet ports A and B, the fourth port designated at T being plugged in this instance. Within the housing of the valve 130 is a slidable valve member 142 which is urged to the left as seen in Figure 15 by a compression spring 144 and which may be moved to the right to the position shown by a solenoid winding 146. The second four-way valve 132 is of identical construction with the valve 130 and has corresponding ports A', B', P', and T', and a slidable valve element 148 urged to the left as seen in Figure 15 by a compression spring 150, and adapted to be moved to the right to the position illustrated in the figure by energization of a solenoid winding 152. A first conduit 154 connects the ports B and P', and conduits 156 and 162 connect the ports A and T'. The conduit W leads from the port B' to the top of the cylinder 70. The exhaust conduit E leads from the bottom of the cylinder 70 to a port Q on metering valve 158. Another conduit 160 interconnects the port A' with a port X on the metering vlave 158. Finally, a conduit 164 connects a port Z on the metering valve 158 with the conduit 156, the latter being connected to pump 126. From the foregoing general description of the connection between the parts it will be observed that in the position shown in Figures 15, both of the solenoids 146 and 152 are energized and the valve elements 142 and 148 are in their right hand position. At this time fluid flows through the conduit 140 into the port P, thence out through the port B into the conduit 154, hence through the port P' into the valve 132 and out through the port B' to the conduit W, thus supplying fluid under pressure to move the piston downwardly in the cylinder 70. At this time fluid expelled from the lower part of the cylinder 70 enters the metering valve 158 through the conduit E and thence returns to the pump 126 through the branch conduit 164 and the return conduit 156. The metering valve 158 is of well known construction and is adapted to restrict the flow of fluid flowing from the conduit E through the metering valve to the conduit 164. The metering valve 158 includes an adjusting member 166 by means of which the restriction to flow of fluid may be adjustably varied. This valve thereby controls the speed at which the piston descends in the cylinder 70.

As will subsequently appear in connection with the description of the wiring diagram, when the piston reaches the bottom of its stroke solenoid 152 is de-energized and the valve element 148 moves to the left in the valve 132. Movement of the valve element 148 to the left connects the ports A' and P' internally of the valve and therefore the pressure fluid flowing through the conduit 154 now passes through the conduit 160 and through the metering valve 158 and the conduit E into the lower portion of the cylinder 70. At the same time fluid expelled from the top of the cylinder 70 passes through the conduit W into the right hand end of the bore of the valve 132 whence it passes through a longitudinal passage 168 through the valve element 148 and out the port T' and thence through conduits 162 and 156 to the pump 126. The metering valve 158 is so arranged that no restriction is opposed to flow of fluid therethrough from the conduit 160 to the conduit E whereby the piston may be given a rapid return stroke.

As the piston reaches the top of the stroke the solenoid winding 146 is de-energized and the valve element 142 will move to the left in the valve 130. This will have the effect of connecting ports A and P internally of the valve so that pressure fluid from the pump 126 will flow through the conduit 140, the valve 130 and return directly to the pump through return conduit 156. This completes the cycle and conditions the parts for initiation of the next cycle by simultaneous energization of the windings 146 and 152.

Referring now to the wiring diagram of Figure 16, the solenoid windings 146 and 152 are shown as connected across the line in series with normally open switches CR1C and CR2C respectively. In order to control the actuation of the solenoid valves the circuit includes a first current relay CR1 and a second current relay CR2 which are adapted respectively upon energization to close normally open switches CR1C and CR2C respectively. It will be appreciated that for simplicity the switches controlled by the current relays bear the same basic identification and are distinguished from each other by the final letters A, B, and C. Thus relay CR1 when energized opens its associated normally closed contacts and closes its associated normally open contacts. The top limit switch LS1, which is normally closed, is maintained in open position between cycles when the slide 50 is at the top of its stroke. Accordingly, the limit switch in the wiring diagram is illustrated in open position. The limit switch LS1 is in series with the current relay CR1 and in series with the starting switch 170. Normally open switch CR1B is connected in parallel around the starting switch and normally open switch CR2B is connected around the top limit switch LS1. The bottom limit switch LS2 is in series with the current relay CR2 and is connected to starting switch 170 by branch circuits including normally closed switch CR1A and normally open switch CR2A. The contacts are illustrated in the condition in which they remain during the interval between strokes of the machine. Closure of the starting switch 170 energizes the current relay CR2 through normally closed switch CR1A and the bottom limit switch LS2 which is closed except when the slide 50 is at the bottom limit of its stroke. Energization of current relay CR2 closes normally open switch CR2A, thus establishing a holding circuit around normally closed switch CR1A. It also closes switch CR2B, thus establishing a holding circuit around limit switch LS1, and also closes normally open switch CR2C, thus energizing relay 152 and moving the slidable valve element 148 to the position shown in Figure 15.

Closure of switch CR2B completes the circuit to current relay CR1 which opens normally closed switch CR1A. However, the holding circuit through switch CR2A is established at this time. Energization of current relay CR1 also closes switch CR1B, thus establishing a holding circuit around the starting switch 170 and the top limit switch LS1 through switch CR1B and switch CR2B in series. Energization of the current relay CR1 also closes switch CR1C, thus energizing relay 146 which moves slidable valve element 142 to the right to the position shown in Figure 15. As described in conjunction with the hydraulic diagram, this results in supply of pressure fluid to the top of the cylinder 70. Initial downward movement of the piston closes limit switch LS1 but this has no immediate effect since a holding circuit has already been completed around this limit switch. However, when the piston reaches the bottom of the stroke limit switch LS2 is momentarily opened, thus interrupting flow of current to current relay CR2. De-energization of current relay CR2 opens switch CR2A and switch CR2B. Opening of switch CR2B at this time does not interrupt the circuit to current relay CR1 since the circuit remains complete through switch CR1B and top limit switch LS1. However, de-energization of current relay CR2 opens switch CR2C and thus de-energizes relay 152 with the result that the slidable valve element 148 moves to the left, as seen in Figure 15, in the valve 132. This has the effect of transferring the flow of pressure fluid from the valve 132 from the conduit W to the conduit 160 and thence through metering valve 158 through conduit E to the bottom of the cylinder. This initiates the return or up stroke of the piston. Fluid escaping above the top of the piston flows through conduit W into the valve 132 to the right of the valve element 148, and thence through the longitudinal bore in the valve element and out through conduits 162 and 156 to the pump. When the piston reaches the top of its stroke it opens limit switch LS1. Since switch CR2B is open at this time, this interrupts the flow of current to current relay CR1 and return switches CR1A, CR1B, and CR1C to the condition illustrated in the figure. This results in the interruption of current to the relay 146 which permits the return of the slidable valve element 142 to the left of the position illustrated in Figure 15. As previously described, this permits the flow of pressure fluid from the pump to return directly to the pump through the conduit 156.

Referring now to Figures 8 through 14 there is illustrated a construction designed to simplify the inner connection between the pump, control valves, metering valve, and the cylinder. As diagrammatically illustrated in Figure 8, a fluid control plate 128 is provided. This plate is preferably rectangular and in diagrammatic Figure 8, the sides of the plate have been folded out to make both visible at the same time. Four-way valves 130 and 132 are bolted directly to the fluid control plate which has ports and passages drilled therein to register with the ports of the four-way valves so as to provide the required fluid flow through the plate 128. In addition, the metering valve 158 is also bolted to the fluid control plate which has ports designed to cooperate with the ports of the metering valve. In order to simplify the description the ports of the several valves have been designated by letters and the same letters have been applied to the cooperating ports of the fluid control plate.

The fluid control plate 128 is designed for direct connection to the pump 126 and for this purpose the conduit 140 illustrated in the hydraulic diagram, is provided as the drilled passage best seen in Figures 9 and 12. The passage 140 in the plate is intersected by a transverse passage providing a port P designed to cooperate with the corresponding port P in the valve 130. The port P as previously described, is alternately connected internally of the valve to the ports A or B. As best seen in Figure 11, the port A connects through a transverse passage in the plate to the drilled passage, portions of which are designated 156 and 164. The portion 156 of the drilled passage is designed to be connected directly to the inlet side of the pump. The plate 128 is provided with a drilled passage 154 which extends directly through the plate providing the ports B and P' at opposite sides thereof, thus constituting the passage or conduit 154 diagrammatically illustrated in Figure 15.

The valve 132 is designed to alternately connect the port P' to the ports A' and B'. The plate 128 is provided with a drilled passage 160 which is closed at its upper end as indicated at 180 and which is intersected by two transverse drilled passages defining the ports A' and X, as best seen in Figures 10 and 12. The port X is a port on the metering valve 158. The plate 128 is provided with the vertical drilled passage W' which is intersected by a transverse drilled passage defining the port B'. The passage W' is connected to the external conduit W previously described, which carries fluid under pressure to the top of the cylinder 70. The conduit E, carrying exhaust fluid from the lower end of the cylinder 70 during the working stroke, is connected to the short drilled passage E' intersected by a transverse passage to define the port Q which cooperates with the corresponding port on the metering valve 158. The metering valve includes a port Z and the fluid control plate includes the drilled passage 164 previously referred to, which is a continuation of the drilled passage 156 and affords communication from the port Z of the metering valve to the drain connection to the pump. The fluid control plate is connected by a transverse drilled passage 162 which intersects the drilled passage constituting the conduits 156 and 164, and the intersection of the passage 162 at the face of the plate provides a port T' which is associated with the corresponding port on the valve 132.

From the foregoing described construction it will be apparent that the complicated external conduits ordinarily employed in connecting a pump to a cylinder where automatic operation is desired, is completely avoided. The plate 128 is connected directly to the pump. The required flow of fluid is channelled through appropriate passages in the plate and the only external connections to the plate, the two four-way valves and the metering valve, are the two conduits connected with the top and bottom of the power cylinder.

The operation of the attachment is apparent from the foregoing, but briefly reviewed it requires only that the operator depress the starting switch which causes a downward movement of the slide 50 at a rate controlled by the metering valve 158, and to a position definitely predetermined by the stop nuts 84. Upon reaching the downward limit of movement the slide 50 returns to its initial position preparatory to a second cycle.

The conversion unit is simple, sturdy, and may be produced at moderate cost. By means of this conversion unit any standard machine tool may be temporarily converted to perform a thread rolling operation. The mechanism supported on the machine tool is readily detachable therefrom. The hydraulic equipment including the pump, motor, valves, etc., is separated from the machine tool and may be placed in a convenient position. The only connections between the hydraulic part of the attachment and the mechanism supported on the machine tool are two fluid conduits and one electrical control conduit.

The drawings and the foregoing specification constitute a description of the improved hydraulic unit in such full, clear, concise and exact terms as to enable any person skilled in the art to practice the invention, the scope of which is indicated by the appended claim.

What I claim as my invention is:

A thread rolling attachment for a machine tool having a movable tool support comprising a support body adapted to be bolted to one surface of said tool support, spaced brackets extending from said support body overlying a second surface of said tool support, a member spanning said brackets, and an adjustable brace carried by said member and engageable with said second surface of said tool support, a slide on said support body, means on said slide for mounting a thread rolling fixture, and hydraulic means on said support for reciprocating said slide thereon.

References Cited in the file of this patent

UNITED STATES PATENTS

| | | |
|---|---|---|
| 783,680 | Chard | Feb. 28, 1905 |
| 1,145,661 | Bailey | July 6, 1915 |
| 2,051,159 | Witte | Aug. 18, 1936 |
| 2,084,898 | Eckardt | June 22, 1937 |
| 2,118,025 | Curtis | May 17, 1938 |
| 2,148,348 | Groene | Feb. 21, 1939 |
| 2,182,906 | Unke | Dec. 12, 1939 |
| 2,358,269 | Wemhoner | Sept. 12, 1944 |
| 2,491,371 | Gardiner et al. | Dec. 13, 1949 |
| 2,491,402 | Tucker | Dec. 13, 1949 |
| 2,518,777 | Harrington et al. | Aug. 15, 1950 |

FOREIGN PATENTS

| | | |
|---|---|---|
| 889,376 | France | Jan. 7, 1944 |